(12) United States Patent
Takado et al.

(10) Patent No.: US 8,376,722 B2
(45) Date of Patent: Feb. 19, 2013

(54) ELECTRIC COMPRESSOR

(75) Inventors: Junji Takado, Wako (JP); Takaharu Sato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 766 days.

(21) Appl. No.: 12/423,383

(22) Filed: Apr. 14, 2009

(65) Prior Publication Data

US 2009/0257895 A1 Oct. 15, 2009
US 2012/0219439 A2 Aug. 30, 2012

(30) Foreign Application Priority Data

Apr. 15, 2008 (JP) .................. 2008-106075

(51) Int. Cl.
*F04D 29/051* (2006.01)
(52) U.S. Cl. .................. 417/423.12; 415/107
(58) Field of Classification Search ............ 417/423.12, 417/423.7, 423.11; 415/107
See application file for complete search history.

(56) References Cited

FOREIGN PATENT DOCUMENTS

| JP | 63-166631 | | 10/1988 |
| JP | 11-013686 | * | 1/1999 |
| JP | 11-218091 | | 10/1999 |
| JP | 2004-245193 | | 2/2004 |
| JP | 2006-234075 | | 9/2006 |

OTHER PUBLICATIONS

JP Office Action, dated May 8, 2012; Issued on Japanese Application No. 2008-106075.

* cited by examiner

*Primary Examiner* — Anh Mai
*Assistant Examiner* — Brenitra M Lee
(74) *Attorney, Agent, or Firm* — Squire Sanders (US) LLP

(57) ABSTRACT

An electric turbo compressor is an air compressor to be used in a fuel cell system, and includes a housing comprised of a compression casing, a motor casing, and a canceller casing, and the housing houses therein an impeller, a rotary shaft, a thrust canceller (a load cancellation section), and a motor unit. The rotary shaft is supported by a thrust air bearing in its thrust direction, and is axially supported by a radial air bearing in its rotating direction. A thrust load is generated at the rotary shaft when the number of rotations of the impeller increases. The pressure of the compressed air acts to the pressure chamber from the compressed air lead-out section of the compression casing via the compressed air passage, and this pressure acts on the canceller flange of the canceller shaft so as to generate a load towards the rear of the rotary shaft. Therefore, the thrust load is cancelled out.

4 Claims, 3 Drawing Sheets

ELECTRIC COMPRESSOR

BACKGROUND OF THE INVENTION

1. Field of the Invention

The present invention relates to an electric compressor which compresses gas with the rotation of an impeller, by rotating a rotary shaft and the impeller with a motor unit.

2. Description of the Related Art

In the conventional electric compressor, for example, there is disclosed a turbo machine equipped with vane wheels (hereinafter referred to as impellers) to both sides of the rotary shaft, in Japanese Patent Laid-Open No. H11-13686 (hereinafter referred to as Patent Document 1). Generally, in this type of compressor, a thrust load proportional to a square of a number of rotations of the impeller generates in the axial direction of the rotary shaft, when the number of rotations of the impeller increases. In the turbo machine disclosed in Patent Document 1, the thrust load is cancelled by making the thrust load generated by the impellers provided to both sides of the rotary shaft to act in a direction opposite to each other. Therefore, in this turbo machine, a dynamic gas bearing, a so-called thrust air bearing, is adopted as a thrust bearing which positions the rotary shaft in the axial direction.

Recently, an attempt for mounting a fuel cell which generates electricity using hydrogen and air (oxygen) to a vehicle is entering a practical phase. In the fuel cell system, there are types where power generation is carried out by supplying compressed hydrogen to the anode side and compressed air to the cathode side. In these types of fuel cell system, a compressor for compressing air is mounted to the vehicle. Such compressor is required to be compact in size and light-weight, from the requests such as downsizing and improvement in fuel consumption of the vehicle. From such viewpoint, the turbo machine disclosed in Patent Document 1 is equipped with the impellers at both sides of the rotary shaft, so that the structure of piping for supplying compressed air to the fuel cell becomes complicated, which makes downsizing and reduction in weight difficult. Further, in this type of the turbo machine, it is necessary to reduce cost to make the same practicable. However, the impeller needs to be light-weight and have high mechanical strength, therefore the cost of the material thereof is high. Further, high precision is necessary in order to process the impeller, therefore the cost of the production thereof is also high. As such, the turbo machine disclosed in Patent Document 1 requiring a pair of impeller is difficult to reduce cost.

However, when only one impeller is provided to one side of the rotary shaft in order to downsize and reduce cost of the compressor, the thrust load proportional to the square of the number of rotations generates as the number of rotations increases, so that the thrust air bearing disclosed in Patent Document 1 cannot withstand the thrust load.

On the other hand, in Japanese Patent Laid-Open No. 2006-234075 (hereinafter referred to as Patent Document 2), there is disclosed a fluid compressor capable of being used in the fuel cell system. The fluid compressor is equipped with a balance piston of a disk shape protruding in the outer peripheral direction of the rotary shaft, a balance chamber provided inside a housing for accommodating therein the balance piston, and an aperture portion provided at the gas outlet side of the balance chamber and which changes the dimension of the fluid channel with the displacement of the axial direction of the rotary shaft with respect to the housing. In the fluid compressor disclosed in Patent Document 2, when the thrust load increases with the increase in the number of rotations of the rotary shaft, the position of the rotary shaft inside the housing changes by the thrust load. In accordance thereto, the fluid passage of the aperture portion is narrowed and the pressure of gas inside the balance chamber increases. By doing so, the load bearing ability of the balance chamber and the balance piston in the thrust direction is improved, so as to make the same capable of withstanding the thrust load.

However, when the rotary shaft moves in the axial direction inside the housing, the clearance between the impeller mounted to the rotary shaft and the casing of the compressor facing the impeller changes. In this type of compressor, the clearance between the impeller and the casing exerts serious effect to the compression efficiency and the surge property. Therefore, the change in the clearance leads to decrease in the compression efficiency and degradation in the surge property. As such, it becomes difficult to supply the compressed air to the fuel cell effectively, and further there is a fear that abnormal noise or abnormal vibration may occur from surging according to circumstances.

SUMMARY OF THE INVENTION

An object of the present invention is to improve an electric compressor, and more specifically to provide an electric compressor which enables reduction in size, weight and cost, as well as having high compression efficiency and good surge property, in order to solve the above-mentioned disadvantages.

The present invention has been made in view of the above object, and provides an electric compressor equipped with a motor unit, a rotary shaft rotated by the motor unit, a motor casing for axially supporting the rotary shaft, a compression casing provided to one end side of the motor casing, and an impeller provided to one end side of the rotary shaft and which rotates inside the compression casing, wherein: the rotary shaft is axially supported by a radial bearing in the motor casing in the rotational direction, and is supported by a thrust air bearing in an axial direction, the thrust air bearing includes a flange portion of a disk shape provided at an outer circumference in the diameter direction of the rotary shaft, a front thrust bearing provided in the front side of the flange portion, and a rear thrust bearing provided in the rear side of the flange portion, the front thrust bearing and the rear thrust bearing are fixed to the motor casing or the compression casing, and are each equipped with a top foil of a thin plate shape which faces both sides of the flange portion, and a bump foil of a corrugated plate shape which elastically supports the top foil, the flange portion is sandwiched by the front thrust bearing and the rear thrust bearing at a predetermined pressure, the motor casing includes a pressure chamber which introduces therein the pressure of gas generated by the rotation of the impeller, and the rotary shaft is equipped with a load cancellation section which faces the pressure chamber and which receives pressure inside the pressure chamber in a direction opposite to the load in the axial direction generated by the rotation of the impeller.

According to the electric compressor of the present invention, the rotary shaft is sandwiched by the thrust air bearing at a predetermined pressure, so that the positioning of the rotary shaft may be carried out accurately. As such, the electric compressor of the present invention is capable of maintaining the clearance between the impeller and the compression casing accurately. Further, the pressure of gas generated by the rotation of the impeller is introduced into the pressure chamber. Therefore, the load cancellation section receives pressure in the direction opposite to the load in the axial direction of the rotary shaft generated by the rotation of the impeller. When the number of rotations of the impeller increases, the thrust load proportional to the square of the number of rotations is generated. However, because the pressure of gas corresponding to the thrust load acts on the load cancellation portion in the direction opposite thereto, the thrust load generated at the rotary shaft may be cancelled out.

Therefore, even when the number of rotations of the impeller increases, excessive thrust load is not generated at the rotary shaft. By doing so, the movement of the impeller in the axial direction may be restrained even under the condition where the impeller is rotating at high speed, so that the clearance between the impeller and the compression casing may be maintained accurately. As seen from above, the electric compressor of the present invention is capable of maintaining the clearance between the impeller and the compression casing accurately not only when the impeller is at halt and when the same is rotating at low speed, but also when the impeller is rotating at high speed. Therefore, the electric compressor of the present invention is capable of stabilizing the compression efficiency, and also restrain occurrence of surging. Further, by providing the load cancellation section, there is no need to increase the load bearing ability of the thrust air bearing. Therefore, the present invention is capable of reducing the size, weight and cost of the thrust air bearing.

Further, in the electric compressor according to the present invention, it is preferable that the rotary shaft is of a hollow tubular shape having a cavity inside, the load cancellation section is provided to the other end side of the rotary shaft, and the impeller and the load cancellation section are connected to each other by the tension shaft via the cavity in the rotary shaft. With such structure, the load generated by the rotation of the impeller in the thrust direction, and the pressure generated at the load cancellation section in the direction opposite to the load generated by the impeller are received by the tension shaft. Therefore, even when the number of rotations of the impeller changes, the variation of the clearance between the impeller and the compression casing may be suppressed to the minimum possible limit.

DESCRIPTION OF THE PREFERRED EMBODIMENT

Figure 1:
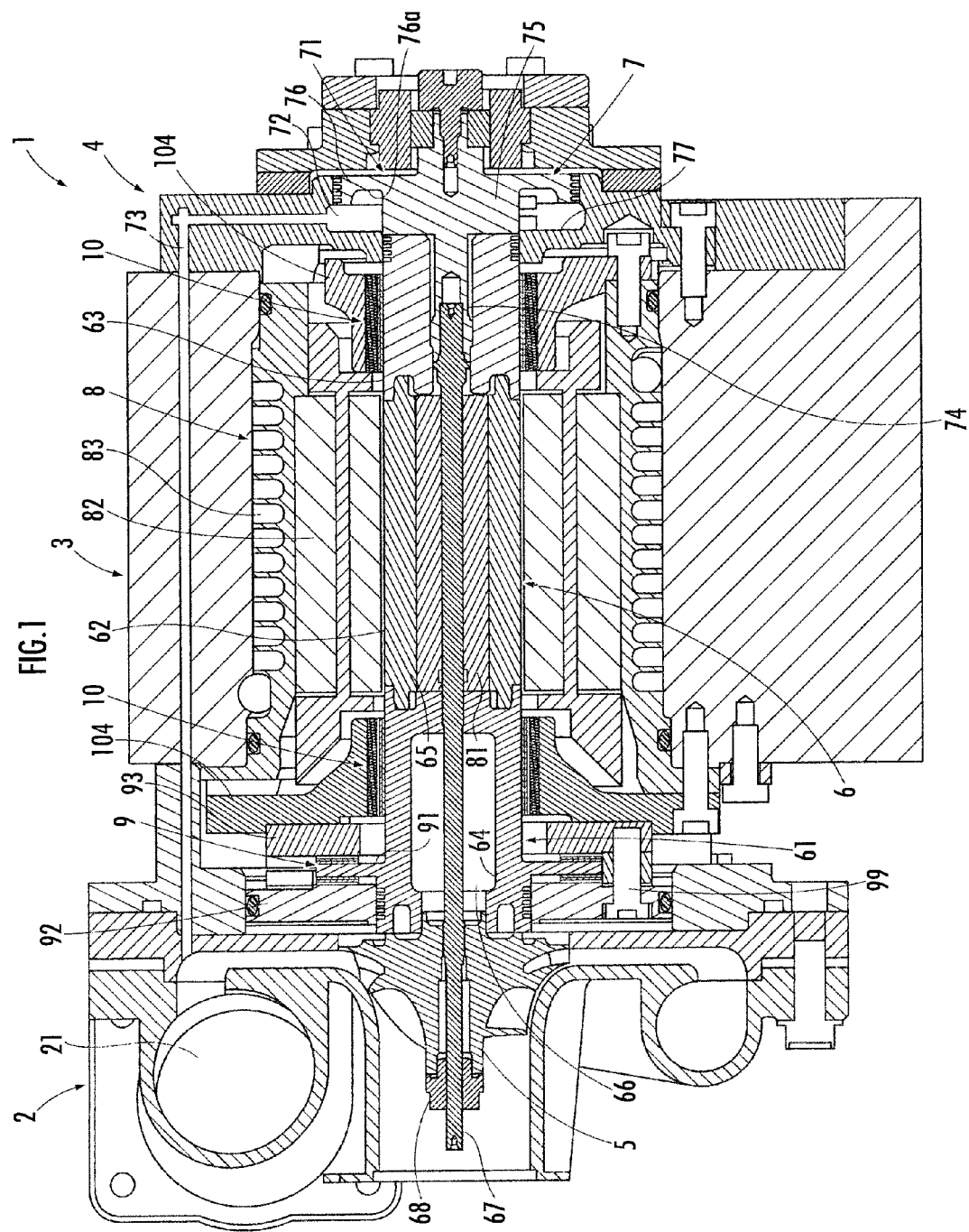
FIG. 1 is an explanatory cross-sectional view of an electric turbo compressor of the present embodiment.
Figure 2:
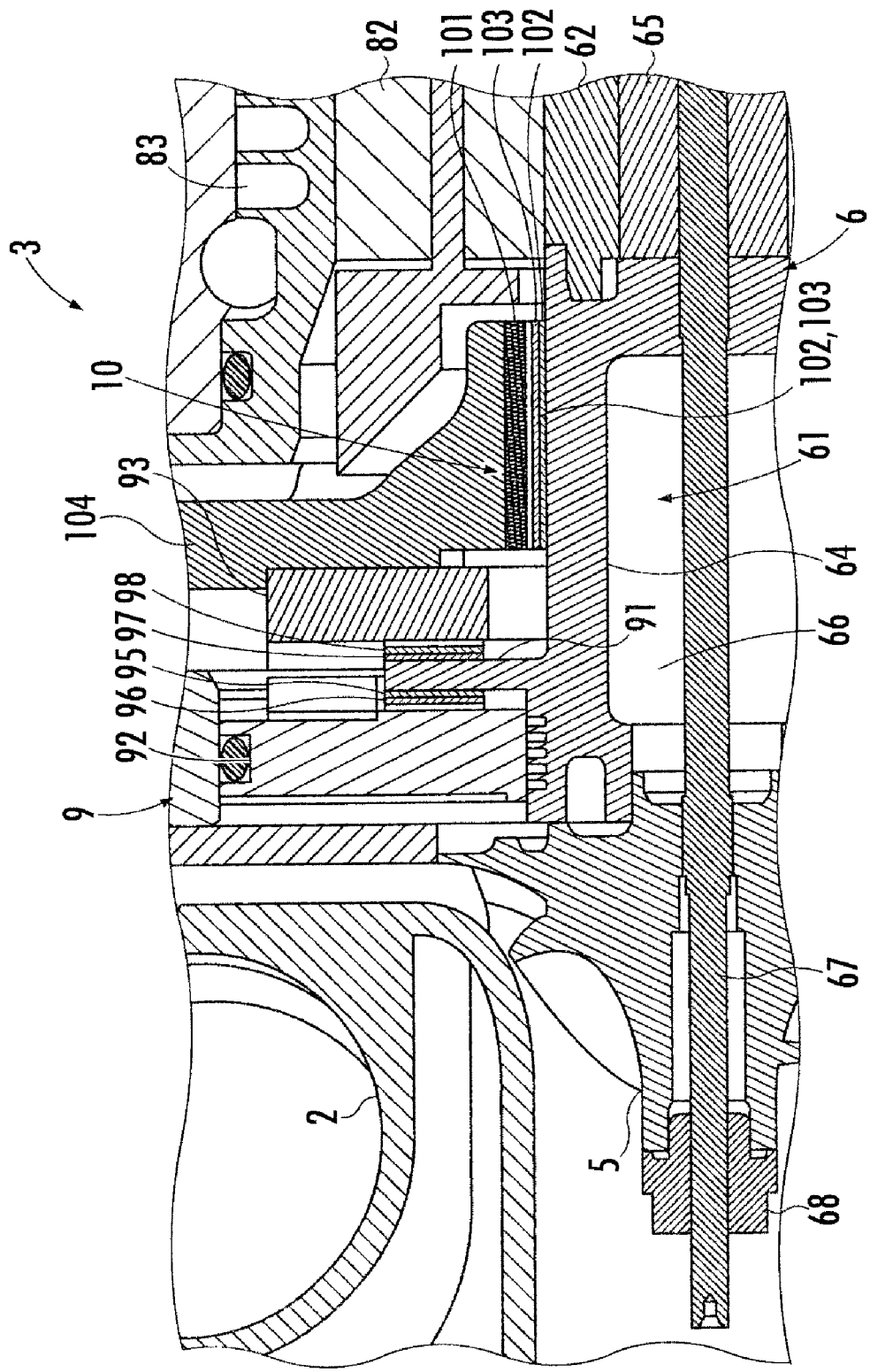
FIG. 2 is an enlarged view of a thrust bearing portion in FIG. 1.
Figure 3:
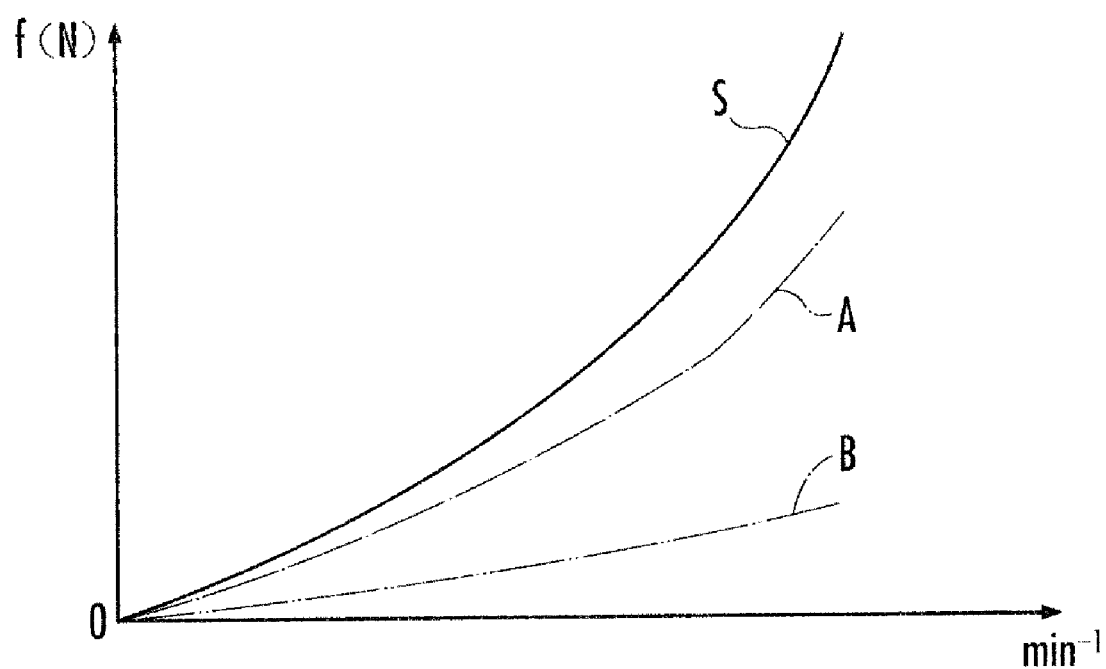
FIG. 3 is a graph showing a relationship between a thrust load and the like generated at the rotary shaft and the number of rotations.

Hereinafter, an electric turbo compressor as an embodiment of an electric compressor of the present invention will be now explained with reference to FIG. 1 through FIG. 3. FIG. 1 is an explanatory cross-sectional view of an electric turbo compressor of the present embodiment, FIG. 2 is an enlarged view of a thrust bearing portion in FIG. 1, and FIG. 3 is a graph showing a relationship between a thrust load and the like generated at the rotary shaft and the number of rotations.

An electric turbo compressor 1 of the present embodiment is an air compressor used in a fuel cell system. As shown in FIG. 1, the electric turbo compressor 1 includes a housing comprised of a compression casing 2, a motor casing 3, and a canceller casing 4, the housing houses therein an impeller 5, a rotary shaft 6, a thrust canceller (a load cancellation section) 7, and a motor unit 8. Further, the rotary shaft 6 is supported by a thrust air bearing 9 in its thrust direction. Still further, the rotary shaft 6 is axially supported by a radial air bearing 10 in its rotating direction.

The compression casing 2 is of a shape typically used for this type of centrifugal air compressor, is equipped with a compressed air lead-out section 21, and is formed from an aluminum alloy or the like. Further, the impeller 5 stored inside the compression casing 2 is of a shape and material used conventionally.

In the present embodiment, the rotary shaft 6 is composed of a plurality of members comprising, in order from the side of the impeller 5, a thrust shaft 61, a motor shaft 62, and a canceller outer 63. The thrust shaft 61 is equipped with a thrust shaft main body 64 of a cylindrical shape, and a flange portion 91 of a disk shape provided to the outer circumferential surface thereof. The flange portion 91 forms a part of the thrust air bearing 9 provided to the motor casing 3. The motor shaft 62 is composed of a cylindrical motor shaft main body 65, and a magnetic rotor 81 provided therein. The magnetic rotor 81 forms a part of the motor unit 8 of the electric turbo compressor 1 of the present embodiment. The canceller outer 63 is of a tubular shape, and is a member to the rear end (right side in FIG. 1) of which a canceller shaft 71, which will be discussed later, is mounted. As seen from above, the rotary shaft 6 takes an overall tubular shape, and is formed at the inside thereof with a cavity 66 connecting in the axial direction.

As shown in FIG. 2, the thrust air bearing 9 is formed from the flange portion 91 of the thrust shaft 61, and a front thrust bearing 92 and a rear thrust bearing 93 provided to the motor casing 3 so as to face both sides of the flange portion 91. The front thrust bearing 92 is provided with a top foil 95 which faces the flange portion 91, and a bump foil 96 of a corrugated plate shape for forcing the top foil 95 against the flange portion 91. The rear thrust bearing 93 is provided with a top foil 97 which faces the flange portion 91, and a bump foil 98 of a corrugated plate shape for forcing the top foil 97 against the flange portion 91. The top foils 95 and 97, and the bump foils 96 and 98 are made from the material conventionally used for this type of foils (for example, material excelling in heat resistance and slidability, such as an aluminum alloy).

In the present embodiment, the rear thrust bearing 93 of the thrust air bearing 9 is fixed to the motor casing 3 by a bolt, which is not shown. Further, as shown in FIG. 1, the front thrust bearing 92 is forced toward the side of the rear thrust bearing 93 at a predetermined force by a bolt 99, while sandwiching the flange portion 91. As shown above, because a preload is imparted to the thrust air bearing 9, the bump foils 96, 98 of the front thrust bearing 92 and the rear thrust bearing 93 are compressed and deformed, so that the flange portion 91 sandwiched by the top foils 95, 97 of the front thrust bearing 92 and the rear thrust bearing 93 is held at a predetermined position in the axial direction (right-left direction in FIG. 1), as shown in FIG. 2.

As shown in FIG. 1, the rotary shaft 6 is axially supported so as to be able to rotate freely by the radial air bearing 10 at the front and the rear of the motor casing 3. The radial air bearing 10 is equipped with a tubular bearing main body 101, a top foil 102 made of a plurality of thin plates of a circular-arch shape provided inside the bearing main body 101, and a bump foil 103 of a corrugated plate shape intervening between the bearing main body 101 and the top foil 102. Further, the radial air bearing 10 is fixed to the interior of the motor casing 3 by a radial bearing holder 104. Here, the radial air bearing 10 is of a configuration similar to those conventionally used for this type of machine.

As shown in FIG. 1, the thrust canceller 7 is equipped with the canceller shaft 71, which is fixed to the rear end portion of the canceller outer 63 of the rotary shaft 6, the pressure chamber 72 formed from the canceller casing 4 and the canceller shaft 71, and a compressed air passage 73 which connects the compressed air lead-out section 21 of the compression casing 2 and the pressure chamber 72. The canceller shaft 71 is equipped with a canceller connection section 74, a canceller column section 75 integrally formed at the rear side of the canceller connection section 74, and a canceller flange 76 protruding axially outward from the rear end portion of the canceller column section 75. The canceller connection section 74 is formed into a cylindrical shape with the opening oriented towards the front (to the direction of the impeller 5). The canceller column section 75 is formed into a columnar shape having the same diameter with the rotary shaft 6. The canceller flange 76 is formed into an approximately disk shape. Further, the canceller casing 4 is formed with a ring-shaped concave portion 77 opening toward the rear side. The pressure chamber 72 is formed from the concave portion 77, the outer circumferential surface of the canceller column section 75, and a surface 76a of one side of the canceller flange 76. In the present embodiment, the canceller casing 4 forms one part of the motor casing 3.

The canceller shaft 71 is connected to the impeller 5 by a tension shaft 67. The tension shaft 67 is provided in the cavity 66 inside of the rotary shaft 6 with the tip portion thereof piercing through the interior of the impeller 5, so as to force the impeller 5 against the tip portion of the rotary shaft 6 with a nut 68. On the other hand, the rear end portion of the tension shaft 67 is screwed onto the canceller connection section 74 of the canceller shaft 71. As shown from above, the tension shaft 67 connects the impeller 5 and the canceller shaft 71, and forces these two members against the rotary shaft 6 at a predetermined tensile force.

To the inside of the motor casing 3, there is provided a stator 82 which forms the motor unit 8, and a refrigerant passage 83 which cools the motor unit 8. Further, in the present embodiment, the compressed air passage 73 of the thrust canceller 7 pierces through the motor casing 3.

Next, the operation of the electric turbo compressor 1 according to the present embodiment will now be explained. When power source is supplied from a power source unit, which is not shown, to the motor unit 8 of the electric turbo compressor 1, electric current is provided to the stator 82. Therefore, torque is generated at the magnetic rotor 81 of the motor shaft 62. At this time, the rotary shaft 6, the impeller 5 fixed to the tip portion of the rotary shaft 6, and the canceller shaft 71 fixed to the rear end portion of the rotary shaft 6 rotates thereby. When the impeller 5 rotates, compressed air is generated in accordance with the rotating speed thereof, so that the compressed air is provided from the compression casing 2 to a fuel cell, which is not shown.

At this time, in the thrust air bearing 9, the flange portion 91 of the thrust shaft 61 rotates in the state of being sandwiched between the front thrust bearing 92 and the rear thrust bearing 93. In the case where the number of rotations of the rotary shaft 6 is low (for example, 1000 $min^{-1}$), the flange portion 91 and both of the top foils 95, 97 of the front thrust bearing 92 and the rear thrust bearing 93 are rotating while sliding against each other. Thereafter, when the number of rotations of the rotary shaft 6 increases, air intervenes between the surface of the flange portion 91 and the surface of the top foils 95, 97 of each thrust bearing, so that the thrust air bearing 9 functions as an air bearing.

Similarly, in the radial air bearing 10, the surface of the rotary shaft 6 and the top foil 102 of the radial air bearing 10 slide against each other when the number of rotations of the rotary shaft 6 is low. When the number of rotations of the rotary shaft 6 increases, air intervenes between the surface of the rotary shaft 6 and the top foil 102 so that the radial air bearing 10 functions as an air bearing.

Further, to the pressure chamber 72 of the thrust canceller 7, air pressure according to the rotation of the impeller 5 is provided from the compressed air lead-out section 21 of the compression casing 2 via the compressed air passage 73. The pressure inside the pressure chamber 72 acts against the surface 76a of one side of the canceller flange 76 of the canceller shaft 71, so as to generate a cancellation load A oriented to the rear side of the rotary shaft 6.

FIG. 3 is a graph showing a relationship between the number of rotations of the impeller 5, a thrust load S generated by the rotation of the impeller 5, the cancellation load A acting on the canceller shaft 71, and a load B acting on the thrust air bearing 9. The axis of ordinate indicates the magnitude of the load (N), and the axis of abscissas indicates the number of rotations ($min^{-1}$) of the rotary shaft 6. In FIG. 3, when the number of rotations of the rotary shaft 6 increases, the thrust load S generated by the rotation of the impeller 5 increases in proportion to the square of the number of rotations. On the other hand, the cancellation load A acting on the canceller shaft 71 increases, as is the same with the thrust load S, in proportion to the square of the number of rotations of the rotary shaft 6.

The thrust load S acts towards the front in the axial direction of the rotary shaft 6, and the cancellation load A acts toward the rear in the axial direction of the rotary shaft 6. Therefore, each of the loads generated in the axial direction of the rotary shaft 6 is cancelled out. Further, in the present embodiment, the impeller 5 and the canceller shaft 71 are connected by the tension shaft 67, so that the thrust load may be cancelled out surely. Therefore, even when the number of rotations of the rotary shaft 6 increases, the degree of the increase of the load B acting on the thrust air bearing 9 will be moderate.

In the electric turbo compressor 1 of the present embodiment, the thrust load acting on the rotary shaft 6 is cancelled out by the thrust canceller 7. Therefore, the cancellation load A of the thrust canceller 7 is set so that it becomes equal to or smaller than the difference between the thrust load S and the load B acting on the thrust air bearing 9. That is, the area of the surface 76a of the canceller flange 76 which receives the pressure is set in accordance with the above-mentioned difference. By setting the cancellation load A as such, there is no need to enlarge the structure of each portion of the thrust air bearing 9 in order to increase the load-bearing ability thereof, so that the thrust air bearing 9 may be made compact and light-weight, and consequently the whole device may be made compact and light-weight. Further, there is no need to strengthen the thrust air bearing 9 more than necessary, so that the reduction in cost may be achieved.

We claim:

1. An electric compressor equipped with a motor unit, a rotary shaft rotated by the motor unit, a motor casing for axially supporting the rotary shaft, a compression casing provided to one end side of the motor casing, and an impeller provided to one end side of the rotary shaft and which rotates inside the compression casing, wherein:

the rotary shaft is axially supported by a radial bearing in the motor casing in the rotational direction, and is supported by a thrust air bearing in an axial direction, the thrust air bearing includes a flange portion of a disk shape provided at an outer circumference in the diameter direction of the rotary shaft, a front thrust bearing provided in the front side of the flange portion, and a rear thrust bearing provided in the rear side of the flange portion, the front thrust bearing and the rear thrust bearing are fixed to the motor casing or the compression casing, and are each equipped with a top foil of a thin plate shape which faces both sides of the flange portion, and a bump foil of a corrugated plate shape which elastically supports the top foil, the flange portion is sandwiched by the front thrust bearing and the rear thrust bearing at a predetermined pressure, the motor casing includes a pressure chamber which introduces therein the pressure of gas generated by the rotation of the impeller, the rotary shaft is equipped with a load cancellation section which faces the pressure chamber and which receives pressure inside the pressure chamber in a direction opposite to the load in the axial direction generated by the rotation of the impeller, and wherein the pressure chamber is sealed by a side face of a canceller flange and a side face of an opening of a canceller casing, the canceller flange provided on an opposite side of the rotary shaft from the impeller.

2. The electric compressor according to claim 1, wherein the rotary shaft is of a hollow tubular shape having a cavity inside, the load cancellation section is provided to the other end side of the rotary shaft, and the impeller and the load cancellation section are connected to each other by the tension shaft via the cavity in the rotary shaft.

3. The electric compressor according to claim 1, wherein the thrust air bearing and the load cancellation section are provided against each other while sandwiching the motor unit, and the thrust air bearing is provided between the impeller and the motor unit.

4. An electric compressor equipped with a motor unit, a rotary shaft rotated by the motor unit, a motor casing for axially supporting the rotary shaft, a compression casing provided to one end side of the motor casing, a canceller casing provided to another end side of the motor casing, an impeller provided to one end side of the rotary shaft and which rotates inside the compression casing, and a canceller shaft provided to another end side of the rotary shaft, wherein:

the rotary shaft is axially supported by a radial bearing in the motor casing in the rotational direction, and is supported by a thrust air bearing in an axial direction, the thrust air bearing includes a flange portion of a disk shape provided at an outer circumference in the diameter direction of the rotary shaft, a front thrust bearing provided in the front side of the flange portion, and a rear thrust bearing provided in the rear side of the flange portion, the front thrust bearing and the rear thrust bearing are fixed to the motor casing or the compression casing, and are each equipped with a top foil of a thin plate shape which faces both sides of the flange portion, and a bump foil of a corrugated plate shape which elastically supports the top foil, the flange portion is sandwiched by the front thrust bearing and the rear thrust bearing at a predetermined pressure, the motor casing includes a pressure chamber formed from the canceller casing and the canceller shaft, a pressure of gas generated by the rotation of the impeller being introduced in the pressure chamber, and the canceller shaft is equipped with a canceller flange formed into a disk shape as a load cancellation section which faces the pressure chamber and which receives pressure inside the pressure chamber in a direction opposite to the load in the axial direction generated by the rotation of the impeller.

* * * * *